(12) United States Patent
Cisternino et al.

(10) Patent No.: US 7,415,997 B2
(45) Date of Patent: Aug. 26, 2008

(54) SEAL ASSEMBLY FOR FUEL FILL PIPES

(75) Inventors: Franco A. Cisternino, Deerfield, IL (US); Bryan K. Happel, Wyoming, MI (US)

(73) Assignee: Illinois Tool Works Inc., Glenview, IL (US)

( * ) Notice: Subject to any disclaimer, the term of this patent is extended or adjusted under 35 U.S.C. 154(b) by 305 days.

(21) Appl. No.: 11/397,373

(22) Filed: Apr. 4, 2006

(65) Prior Publication Data

US 2007/0023102 A1 Feb. 1, 2007

Related U.S. Application Data

(60) Provisional application No. 60/702,675, filed on Jul. 26, 2005.

(51) Int. Cl.
*B65B 3/04* (2006.01)
*B65B 3/00* (2006.01)
*B67C 3/00* (2006.01)

(52) U.S. Cl. .................. 141/368; 141/350; 141/312; 141/390; 220/86.2

(58) Field of Classification Search ................ 141/287, 141/348–350, 368, 383, 390, 312; 220/86.2
See application file for complete search history.

(56) References Cited

U.S. PATENT DOCUMENTS

| | | | | |
|---|---|---|---|---|
| 3,334,779 A * | 8/1967 | Smith | ..................... | 220/86.2 |
| 3,478,922 A * | 11/1969 | Mole | ..................... | 220/86.2 |
| 3,903,942 A * | 9/1975 | Vest | ..................... | 141/301 |
| 4,883,103 A * | 11/1989 | Szlaga et al. | ..................... | 141/368 |
| 5,271,438 A * | 12/1993 | Griffin et al. | ..................... | 141/59 |
| 6,035,906 A * | 3/2000 | Ott | ..................... | 141/312 |
| 7,082,973 B2 * | 8/2006 | Ganachaud et al. | ..................... | 141/350 |
| 2004/0142135 A1* | 7/2004 | Verschuere et al. | ..................... | 428/36.91 |

* cited by examiner

*Primary Examiner*—Nicolas A Arnett
(74) *Attorney, Agent, or Firm*—Mark W. Croll; Paul F. Donovan

(57) ABSTRACT

A seal assembly is provided for a fill pipe of a vehicle fuel system to provide a pliable seal between an end of the fuel pipe and a refueling nozzle inserted in the fill pipe.

11 Claims, 3 Drawing Sheets

# SEAL ASSEMBLY FOR FUEL FILL PIPES

CROSS-REFERENCE TO RELATED APPLICATIONS

The present regular United States patent application claims the benefits of U.S. Provisional Application Ser. No. 60/702,675, filed on Jul. 26, 2005.

FIELD OF THE INVENTION

The present invention relates generally to seals and to automobile fuel systems and, more particularly, the invention pertains to a sealing structure or assembly on fuel fill pipe that cooperates with a refueling nozzle inserted in the fill pipe.

BACKGROUND OF THE INVENTION

Vehicle fuel systems are known to include a tank for holding fuel and a fuel fill pipe that functions as an inlet for supplying fuel to the tank from a nozzle at a refueling station. Vehicle fuel systems are known to include primary and secondary shutoffs to close the system.

The fuel fill pipe has an opening that can be exposed during refueling to receive the nozzle. Both capless and capped fuel fill pipes are known. An exposed end portion of the fuel fill pipe is of sufficient size to receive a discharge tube of a refueling nozzle at a fuel pumping system. It is known to have the nozzle fit relatively loosely in the fill pipe so that it can be inserted and removed easily, without undo physical interference. Accordingly, the fuel fill pipe is of greater diameter than the refueling nozzle, and a space exists between the nozzle and the fill pipe when the nozzle is position in the fill pipe.

Disadvantages experienced with some fuel systems during a refueling operation result from the relatively free airflow that can occur through the fill pipe via the space between the fuel fill pipe and the refueling nozzle outlet tube. The relatively brisk flow of fuel through the fuel fill pipe can entrain air therewith. The entrained air is readily replaced by air entering the fuel fill pip around the nozzle outlet tube, allowing the entrained air to be carried into the fuel tank. As the fuel tank fills with fuel, air displaced in the tank by the increasing volume of fuel is expelled from the tank. The expelled air carries hydrocarbons with it, whether the air was in the tank prior to when refueling commenced, or was carried into the tank by entrainment with the fuel stream entering the tank.

It is known to provide a vapor outlet system from the fuel tank, including a carbon canister to remove hydrocarbons from the air before the air is released into the atmosphere. However, since airflow is relatively unrestricted through the fill pipe and post the nozzle, escaping air and hydrocarbons from the tank can follow that path as well, avoiding the vapor outlet system and carbon canister, and being released into the atmosphere untreated.

The size of the carbon canister in the vapor outlet system is selected for the amount of hydrocarbons to be removed and for the volume of air to be processed through the canister. Accordingly, reducing air entrainment with the fuel during refueling, and thereby reducing hydrocarbon vapors expelled during refueling, reduces the hydrocarbon removal capacity required for the hydrocarbon canister. Decreasing the canister in both size and performance requirements can result in significant cost savings.

SUMMARY OF THE INVENTION

The present invention provides a seal between the fuel fill pipe of an automobile fuel system and a refueling nozzle inserted into the fuel system.

In one aspect thereof, the present invention provides a vehicle fuel system with a fuel tank and a fuel fill pipe in flow communication with the tank. The fill pipe has an opening at an end thereof configured for receiving a fuel supply nozzle therein. A substantially annular flexible seal is disposed at the opening for engaging a nozzle inserted in the fill pipe.

In another aspect thereof, the present invention provides an inlet seal assembly for a vehicle fuel system having a fill pipe with a terminal end. The inlet seal assembly includes a pliable body having an outer ring and a plurality of tabs extending inwardly from the ring. A cap ring holds the pliable body against the terminal end of the fill pipe.

In a still further aspect thereof, the present invention provides a vehicle fuel system with a fuel tank and a fuel fill pipe in flow communication with the tank. The fill pipe has an open end configured for receiving a nozzle of a refueling system. A pliable seal extends radially inwardly at the fill pipe open end and defines an opening for receiving a nozzle therethrough.

An advantage of the present invention is providing a seal between a vehicle fuel system fill pipe and a refueling nozzle to reduce air admitted through the fill pipe and thereby decrease air entrainment with the fuel during refueling.

Another advantage of the present invention is providing a seal between a fill pipe of a vehicle fuel system and a refueling nozzle inserted therein to reduce the volume of fumes escaping untreated from the fuel tank via the fill pipe.

A further advantage of the present invention is providing a seal between a fill pipe of a vehicle fuel system and a refueling nozzle inserted therein which retards air flow there past during normal refueling conditions, and also provides over-fill and over-pressure relief if over-fill or over-pressure occurs.

Still another advantage of the present invention is providing a seal between a vehicle fuel system fill pipe and a refueling nozzle inserted therein that does not interfere with known, common refueling procedures and is easy to use.

Yet another advantage of the present invention is providing a seal between a vehicle system fill pipe and a refueling nozzle inserted therein that can be installed quickly and easily at minimal cost.

Other features and advantages of the invention will become apparent to those skilled in the art upon review of the following detailed description, claims and drawings in which like numerals are used to designate like features.

Figure 1:
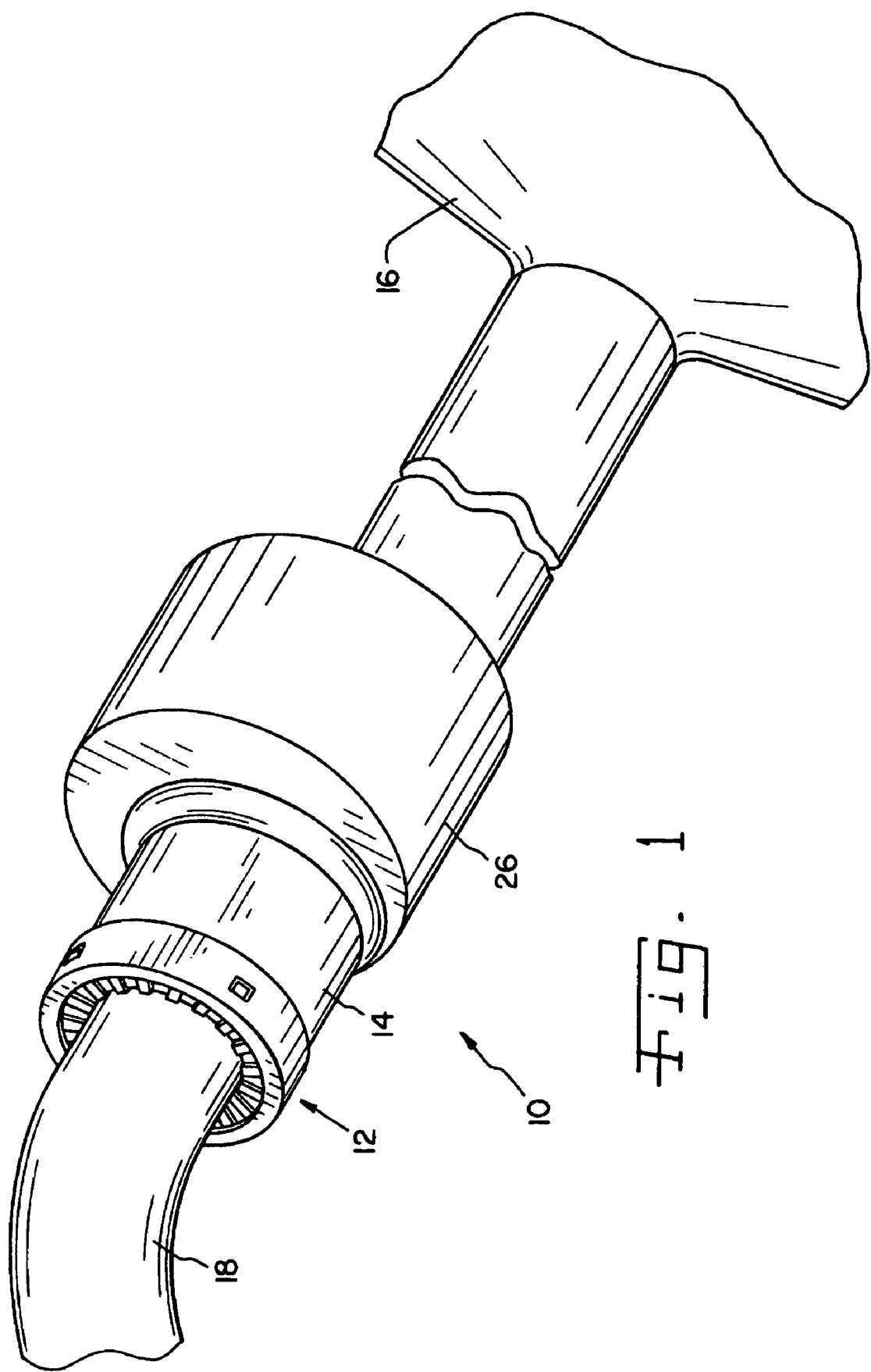
FIG. 1 is a perspective view of a vehicle fuel system having a seal assembly in accordance with the present invention, with the system illustrated during a refueling operation.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a vehicle fuel system 10 is shown with a seal assembly 12 in accordance with the present invention. Seal assembly 12 is provided at an outer end of a fuel fill pipe 14 leading to a fuel tank 16. As illustrated in FIG. 1, fuel system 10 is undergoing a refueling operation, with a nozzle 18 from a fuel supply pump inserted through seal assembly 12 and into fuel fill pipe 14.

Fill pipe 14 and fuel tank 16 can be of generally known configuration and made of metal and/or fuel resistant plastics. Seal assembly 12 is attached at a terminal end 20 of fill pipe 14. In the exemplary embodiment shown, an outer surface 22 of fill pipe 14 near terminal end 20 is provided with a plurality of protrusions 24 to cooperate with seal assembly 12 in a manner to be described hereinafter for holding seal assembly 12 against terminal end 20. As known to those skilled in the art, an expansion chamber 26 is provided within fill pipe 14 for positioning the end of refueling nozzle 18 to promote efficient operation of nozzle 18 and flow of fuel therefrom.

Seal assembly 12 includes first and second pliable or flexible seal bodies 30, 32, respectively, and a cap ring 34. First and second pliable bodies 30, 32 are sandwiched between a portion of cap ring 34 and terminal end 20 of fill pipe 14.

Pliable seal bodies 30, 32 are substantially similar and are made of fuel resistant material such as various nitriles or other materials suitable for seal applications and having some flexibility and resistance to fuels. VITON®, a fluoroelastomer available from DuPont Performance Elastomers, Wilmington Del., USA, is a suitable material having the desired compatibility for exposure to fuels.

Figure 4:
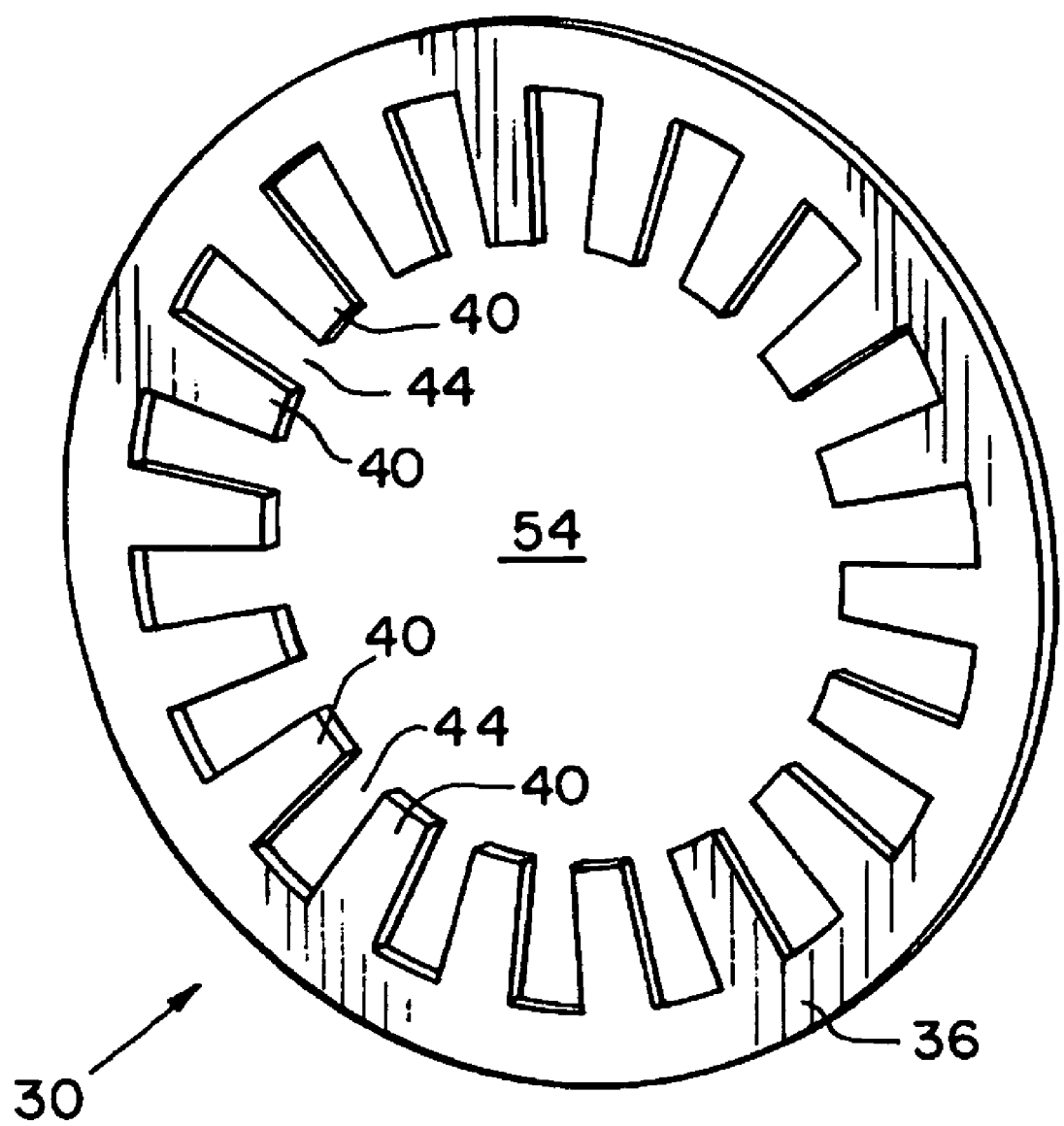
FIG. 4 is a perspective view of one of the seal bodies for the seal assembly shown in the previous drawings.

In the exemplary embodiment shown, seal bodies 30, 32 are of generally annular shape, having outer rings 36, 38, respectively. A plurality of tabs 40, 42 project inwardly from outer rings 36, 38, respectively. Adjacent tabs 40, 42 of bodies 30, 32 are spaced from each other, thereby defining spaces 44, 46, respectively, therebetween. Seal body 30 is shown individually and enlarged in FIG. 4 with only some and not all tabs 40 and spaces 44 being designated with reference numerals.

Cap ring 34 includes a side 48 and an end 50. Side 48 is of sufficient internal diameter to encircle fill pipe 14 snugly. Side 48 defines a plurality of windows 52 for receiving protrusions 24. End 50 extends radially inwardly a limited distance from side 48 and substantially overlies outer rings 36, 38 of bodies 30, 32 and terminal end 20 of fill pipe 14 in the completed assembly.

Figure 2:
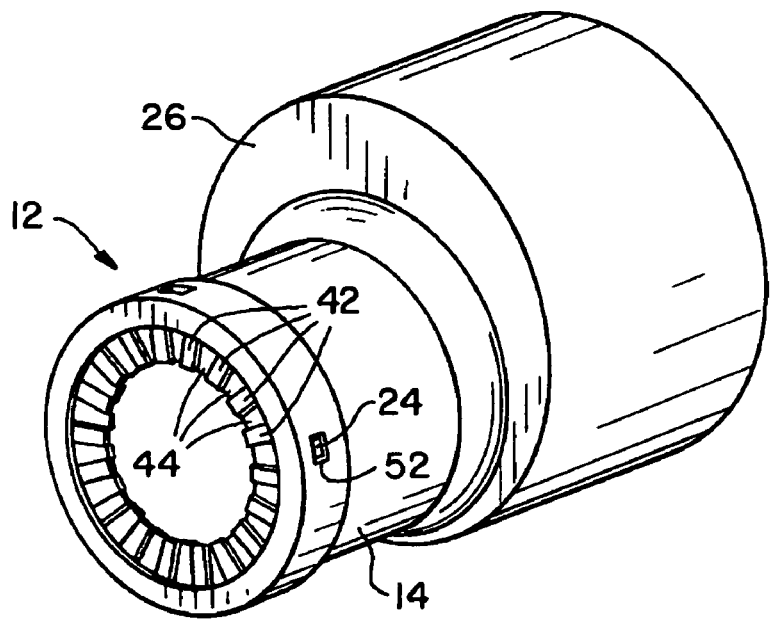
FIG. 2 is a perspective view of the fuel fill pipe and seal assembly shown in FIG. 1.
Figure 3:
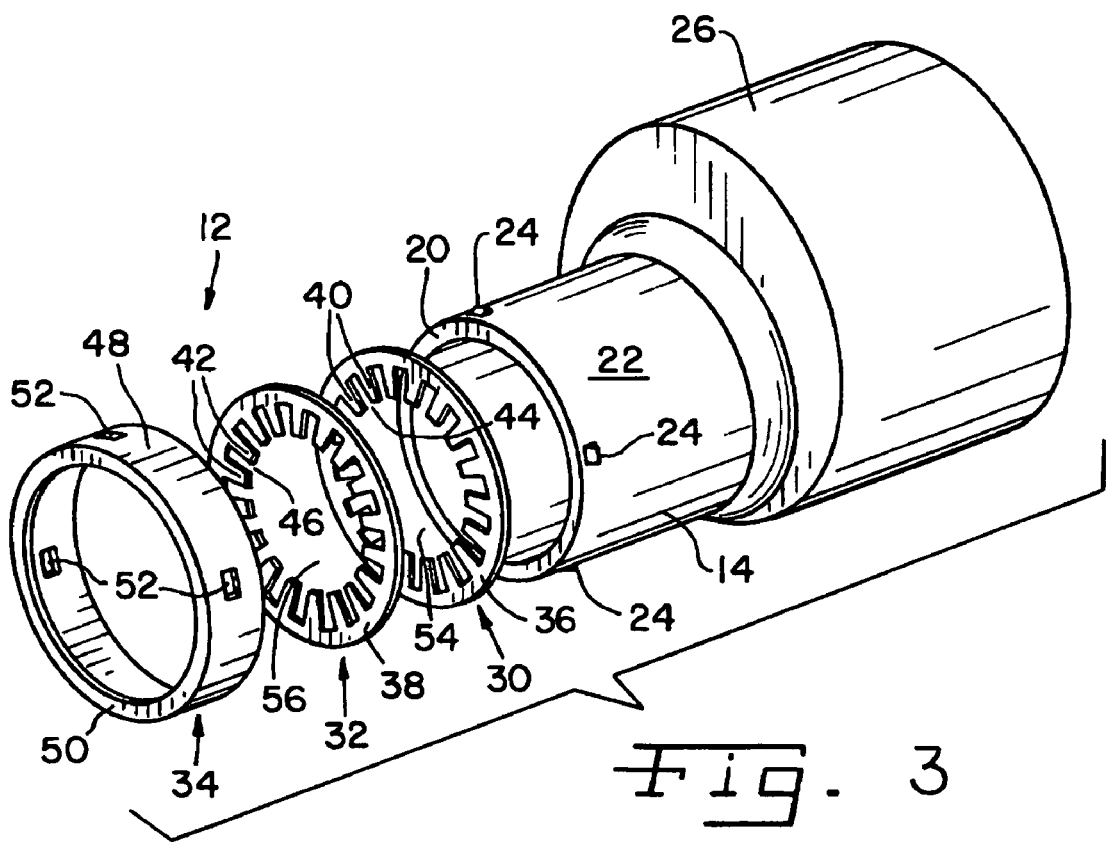
FIG. 3 is an exploded view of the fuel fill pipe and seal assembly shown in FIGS. 1 and 2.

As seen most clearly in FIG. 2, seal assembly 12 is installed on fill pipe 14 with pliable bodies 30, 32 positioned relative to each other such that tabs 40, 42 of one body 30, 32 overly the spaces 46, 44 defined by the other body 32, 30, respectively. In the exemplary embodiment shown, cap ring 34 secures pliable bodies 30, 32 against terminal end 20, with side 48 encircling the end of fill pipe 14 and positioned thereon such that each protrusion 24 is received a window 52 to hold cap ring 34 in position on fill pipe 14. It should be understood that other types of connections for cap ring 34 on fill pipe 14 can be used, such as, for example, the use of other direct mechanical engagements included threaded connections, the use of fasteners and the use adhesive. Further, one or more clip or fastener, or other connection instead of cap ring 34 can be used to secure the position of seal bodies 30, 32 relative to fill pipe 14.

Tabs 40, 42 project inwardly from outer rings 36, 38 and define openings 54, 56, respectively, through which nozzle 18 is inserted during refueling. Openings 54, 56 are sufficiently small in the exemplary embodiment so that distal ends of tabs 40, 42 slidingly engage nozzle 18, when nozzle 18 is inserted in fill pipe 14. Accordingly, the heretofore known space between nozzle 18 and fill pipe 14 is substantially closed by pliable bodies 30, 32. Airflow is thereby limited in both directions, from the ambient atmosphere to tank 16 via fill pipe 14 and from tank 16 to the ambient atmosphere via fill pipe 14. Accordingly, a stream of fuel flowing through fill pipe 14 and into tank 16 is not supplied with a large volume of fresh air for entrainment. As a result, less air enters tank 16 and less air is expelled from tank 16 as fuel enters tank 16. Carbon canisters or other hydrocarbon removing devices can be of smaller capacity for treating smaller volumes of air. The escape of untreated air is reduced by inhibiting airflow from tank 16 to the atmosphere through fill pipe 14.

Pliable seal bodies 30, 32 form an effective seal or barrier to limit airflow as described during normal refueling operations when substantially equal pressures are present on opposite sides of bodies 30, 32. However, in the event of abnormal conditions such as over-pressure or over-fill in tank 16, tabs 40, 42 can be deflected by the unequal pressures on opposite sides thereof to relieve pressure or fuel from tank 16 and fuel fill pipe 14. If the tank vapor relief system is blocked or fails to pass a sufficient flow therethrough, or automatic shut-off features of nozzle 18 fail to perform adequately, and increased pressure or fuel reaches seal assembly 12 from the tank side thereof, one, several or all tabs 40, 42 can be deflected outwardly to break the seal against nozzle 18 and relieve an over-pressure condition, or to allow a limited, controlled flow of fuel from an over-fill condition.

Seal bodies 30, 32 have been described with respect to the exemplary embodiment as being substantially similar. However, it should be understood that bodies 30, 32 need not be identical, and may incorporate variations therein for the desired performance of seal assembly 12. For example, tabs 40 or 42 of one can be longer or shorter, wider or narrower than the tabs of the other, to promote easy insertion and withdrawal of nozzle 18 and smooth operation and relief in the event of an over-pressure or over-fill condition by achieving the desired deflection of tabs 40, 42. Other variations can be used, such as, for example and not limitation, the thicknesses of bodies 30, 32, the widths of outer rings 36, 38 or the materials from which bodies 30, 32 are made. It is further contemplated that a single seal body can be used rather than overlying seal bodies, and that overlie seal bodies can be joined to each other for installation.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A vehicle fuel system comprising:
a fuel tank;
a fuel fill pipe in flow communication with said tank, said fill pipe having a first opening at an end thereof configured for receiving a fuel supply nozzle therein; and
a substantially annular flexible seal disposed at said first opening for engaging a nozzle inserted in said fill pipe, said flexible seal substantially surrounding said first opening at an edge thereof without entirely closing said first opening so as to thereby define a second opening wherein said second opening is axially aligned with said first opening, said flexible seal adapted to flex inwardly into said fuel fill pipe when engaged by the nozzle to create a seal against the nozzle, and said flexible seal being further adapted to flex outwardly with respect to said fuel fill pipe to break the seal against the nozzle under certain conditions; said seal comprising first and second seal bodies secured one against another at a terminal end of said fill pipe, said bodies each having a substantially annular outer ring and a plurality of tabs extending inwardly from said outer ring thereof, adjacent tabs of said plurality of tabs on each said body being spaced from each other, said first and second seal bodies being arranged with respect to each other against said terminal end of said fill pipe such that said tabs of one said seal body overlie said spaces defined between said tabs of the other said seal body.

2. The vehicle fuel system of claim 1, including a cap ring holding said seal bodies against said terminal end of said fill pipe, said cap ring having an annular side encircling said pipe and having an end, and said seal bodies being sandwiched between said terminal end of said fill pipe and said cap ring end.

3. The vehicle fuel system of claim 2, said annular side of said cap ring defining a plurality of windows, and said fill pipe defining a plurality of protrusions on an outer surface thereof, said protrusions being received in said windows.

4. An inlet seal assembly for a vehicle fuel system having a fill pipe with a terminal end, said inlet seal assembly comprising:
a pliable body having an outer ring and a plurality of tabs extending inwardly from said ring; and
a cap ring adapted to hold said pliable body against said terminal end of said fill pipe, wherein said tabs are configured to define an opening around said terminal end such that ends of said tabs defining said opening are configured to be substantially equally spaced from a center point of said terminal end and an outer edge thereof, and such that said tabs are configured to flex inwardly and outwardly with respect to said fill pipe; wherein said pliable body includes two said bodies adapted to be disposed one against the other between said cap ring said terminal end of said fill pipe, adjacent tabs of said plurality of tabs of each said body being spaced from each other, and said bodiers overlying each other such that said tabs of one said body overlie spaces defined between said tabs of the other said body.

5. The inlet seal assembly of claim 4, said bodies being nitrile.

6. The inlet seal assembly of claim 4, said bodies being made of a fluoroelastomer.

7. The inlet seal assembly of claim 4, said cap ring having a side configured for encircling a fuel fill pipe, said side defining a plurality of windows.

8. The inlet seal assembly of claim 4, said cap ring having a side configured for encircling a fuel fill pipe, said side defining a plurality of windows.

9. A vehicle fuel system comprising:
a fuel tank;
a fuel fill pipe in flow communication with said tank, said fill pipe having an open end configured for receiving a nozzle of a refueling system;
a pliable seal extending radially inwardly at said fill pipe open end, said seal defining an opening for receiving a refueling nozzle therethrough, said seal comprising first and second substantially annular bodies each having a plurality of tabs projecting inwardly relative to said fill pipe, adjacent tabs in each said plurality of tabs defining spaces therebetween, and said tabs of one said body overlying said spaces defined by said tabs of the other said body; and
a cap ring secured to said fill pipe and sandwiching said first and second bodies against said fill pipe,
wherein said pliable seal substantially surrounds said fill pipe open end at an edge thereof without closing said open end, said tabs of said pliable seal flexing inwardly into said fuel fill pipe when engaged by the nozzle so that said tabs create a seal against the nozzle, and said tabs of said pliable seal flexing outwardly with respect to said fuel fill pipe to break the seal against the nozzle under pre-defined conditions.

10. The vehicle fuel system of claim 9, said cap defining a plurality of windows and said fill pipe defining a plurality of protrusions received in said windows.

11. The vehicle fuel system of claim 9, said bodies comprising a fluoroelastomer.

* * * * *